(12) United States Patent
Vänskä et al.

(10) Patent No.: US 10,734,930 B2
(45) Date of Patent: Aug. 4, 2020

(54) ELECTRIC POWER GENERATING SYSTEM

(71) Applicant: ABB Schweiz AG, Baden (CH)

(72) Inventors: Klaus Vänskä, Tolkkinen (FI); Pasi Pohjanheimo, Kirjala (FI); Sami Kanerva, Vantaa (FI); Mikko Kajava, Helsinki (FI)

(73) Assignee: ABB Schweiz AG, Baden (CH)

( * ) Notice: Subject to any disclaimer, the term of this patent is extended or adjusted under 35 U.S.C. 154(b) by 12 days.

(21) Appl. No.: 15/522,131

(22) PCT Filed: Oct. 8, 2015

(86) PCT No.: PCT/EP2015/073284
§ 371 (c)(1),
(2) Date: Apr. 26, 2017

(87) PCT Pub. No.: WO2016/066396
PCT Pub. Date: May 6, 2016

(65) Prior Publication Data
US 2017/0338759 A1 Nov. 23, 2017

(30) Foreign Application Priority Data
Oct. 27, 2014 (EP) .................................... 14190434

(51) Int. Cl.
*H02P 9/00* (2006.01)
*B63H 23/24* (2006.01)
(Continued)

(52) U.S. Cl.
CPC ............. *H02P 9/008* (2013.01); *B63H 23/24* (2013.01); *H02J 3/34* (2013.01); *H02J 3/46* (2013.01);
(Continued)

(58) Field of Classification Search
CPC ... H02P 9/008; H02P 9/14; H02P 9/48; B63H 23/24
See application file for complete search history.

(56) References Cited

U.S. PATENT DOCUMENTS 7,218,014 B2 * 5/2007 Steinke ...................... H02J 3/36
307/84
9,628,010 B2 * 4/2017 Clarke ....................... H02P 9/04
(Continued)

FOREIGN PATENT DOCUMENTS

| EP | 2662339 A1 | 1/2014 |
| JP | 58075497 A | 5/1983 |

(Continued)

OTHER PUBLICATIONS

European Search Report, EP14190434, ABB Technology AG, dated Mar. 30, 2015, 2 pages.
(Continued)

*Primary Examiner* — Tulsidas C Patel
*Assistant Examiner* — Joseph Ortega
(74) *Attorney, Agent, or Firm* — Taft Stettinius & Hollister LLP; J. Bruce Schelkopf

(57) ABSTRACT

An electric power generation system and a method in an electric power generation system. The system comprising one or more generators for producing electrical energy, each generator being arranged to be driven with a corresponding prime mover, wherein the generators are multiphase AC generators adapted to generate a multiphase voltage having a frequency and an amplitude, the phase outputs of the generators are connectable to a common multiphase bus for distributing the electrical energy generated by the AC generators, the system comprises further means for providing independent reference values for a rotational speed of the prime movers and for amplitude of the multiphase voltage, the rotational speed of the prime movers defining the fre- (Continued)

quency of the multiphase voltage, and the system is adapted to operate in at least three operation points on the basis of the provided independent reference values, an operation point being defined by a ratio of the amplitude of the multiphase voltage to the frequency of the multiphase voltage, wherein the at least three operation points are different.

20 Claims, 3 Drawing Sheets

(51) Int. Cl.
    *H02P 9/14*     (2006.01)
    *H02P 9/48*     (2006.01)
    *H02J 3/46*     (2006.01)
    *H02J 3/34*     (2006.01)

(52) U.S. Cl.
    CPC ............... *H02P 9/14* (2013.01); *H02P 9/48* (2013.01); *B60L 2200/32* (2013.01); *Y02E 60/721* (2013.01); *Y04S 10/126* (2013.01)

(56) References Cited

U.S. PATENT DOCUMENTS

| | | | | |
|---|---|---|---|---|
| 2003/0011348 A1* | 1/2003 | Lof | ........................ | H02J 3/382 322/37 |
| 2006/0108882 A1* | 5/2006 | Michalko | ............... | H02K 7/003 310/83 |
| 2008/0079400 A1* | 4/2008 | Lacaze | .................... | H02K 3/28 322/20 |
| 2008/0116759 A1* | 5/2008 | Lin | ........................ | H02K 3/28 310/184 |
| 2009/0184575 A1 | 7/2009 | Armstrong et al. | | |
| 2010/0283318 A1* | 11/2010 | Crane | .................... | B63H 23/24 307/9.1 |
| 2010/0284117 A1* | 11/2010 | Crane | ................. | H01H 33/596 361/93.1 |
| 2011/0254368 A1* | 10/2011 | Boe | ........................ | B63H 21/17 307/18 |
| 2012/0223524 A1* | 9/2012 | Williams | ................ | H02J 3/005 290/50 |
| 2012/0302112 A1 | 11/2012 | Hartig et al. | | |
| 2013/0270902 A1* | 10/2013 | Andersen | ................ | H02H 7/26 307/9.1 |
| 2014/0008988 A1 | 1/2014 | Clarke et al. | | |
| 2014/0077607 A1* | 3/2014 | Clarke | .................... | H02J 3/005 307/75 |

FOREIGN PATENT DOCUMENTS

| | | |
|---|---|---|
| JP | H02131399 A | 5/1990 |
| JP | H02307396 A | 12/1990 |
| JP | 2005348481 A | 12/2005 |
| JP | 2006352990 A | 12/2006 |
| JP | 2011063173 A | 3/2011 |
| JP | 2013106447 A | 5/2013 |

OTHER PUBLICATIONS

International Preliminary Report on Patentability, PCT/EP2015/073284, dated Nov. 30, 2016, 7 pages.
International Search Report and Written Opinion, PCT/EP2015/073284, dated May 6, 2016, 10 pages.
Korean Office Action dated Apr. 30, 2018; Korean Application No. 10-2017-7014295; ABB Schweiz AG; 14 pgs. (including translation).
Japanese Office Action dated Jul. 26, 2018; Japanese Application No. 2017541159; 8 pgs. (including translation).

* cited by examiner

ELECTRIC POWER GENERATING SYSTEM

FIELD OF THE INVENTION

The present invention relates to electric power generating systems, and more particularly to stand-alone electric power generating systems.

BACKGROUND OF THE INVENTION

Stand-alone electric power generating systems are used in situations or locations in which electrical connection to a wide area electrical network is not possible. Such stand-alone systems are also used in ships, yachts and other sea crafts in which prime movers connected to electrical generators are employed for producing electrical energy to be consumed by the various electrical devices in the ships or the like. The generated electrical energy is used by the devices required for propulsion of the ship and for powering the various components and systems related to the operation of the ship. Further, in passenger ships, the passengers also consume vast amount of electrical energy either directly with electrical equipment or indirectly using the comforts available on board.

It is known to provide electrical energy to a ship by generating AC power with generators connected to the prime movers. The prime movers use various energy sources, such as diesel fuel and fuel oil, for producing rotational movement for the generator. The generated AC power is transformed to a suitable voltage level for different purposes. In large ships multiple generators are operated in parallel and the operation is supervised by an upper control system. The upper control system controls the power management of the generators by changing the number of active generators when the power demand requires it. The upper control system is configured such that the operation of the power generating system operates in a stabile manner regardless of the changes in the power demand.

The control of the generated power is carried out by controlling the fuel injection of the prime mover such that the prime mover keeps its rotational speed constant. When, for example, the load of the generator increases, the fuel injection is also increased so as to keep the rotational speed constant. As the generator is connected directly to the shaft of the prime mover, the output frequency of the generated AC power is also kept constant.

In another approach each prime mover-generator set is equipped with an AC to DC rectifier. The outputs of the rectifiers are connected to a common DC bus. The generated electrical power is further converted to AC power so that the power can be consumed with AC devices. In such structure the output frequency of each generator-prime mover set can be controlled to optimize the operation of the system. In a power generation system with DC distribution the amount of electrical components is large as each generator requires a separate rectifier. In large installations where the amount of installed power is high, the required DC components, such as circuit breakers, are expensive as the operation is in medium voltage level. Further, another conversion of power is needed when the DC voltage is converted back to AC voltage for the consumers.

Document EP 2682339 A1 discloses a system, in which the frequency of the AC-distribution network is variable. In the system the speed of the prime movers is kept as low as possible to maximise efficiency.

BRIEF DESCRIPTION OF THE INVENTION

An object of the present invention is to provide a system and method so as to solve the above problems. The objects of the invention are achieved by a system and method which are characterized by what is stated in the independent claims. The preferred embodiments of the invention are disclosed in the dependent claims.

The invention is based on the idea of producing multiphase AC voltage with one or more generators to a common multiphase bus with an adjustable frequency and substantially constant voltage. The prime movers that are used for rotating generators for producing electrical energy are given a rotational speed reference that can be selected according to various aspects.

The advantage of the invention is that the operation point of the prime movers can be set to desired value according to preferences of the operator. The invention allows using a fixed rotational speed that is not necessarily the nominal rotational speed of the prime movers. When a substantially constant voltage is produced by the one or more generators, the generated power is not dependent on the frequency and thus the full generating power is available at all the frequencies. As the voltage is kept substantially constant with varying frequency, each single consumer obtains full power without specific arrangements, such as frequency converters with active front ends. Thus the frequency can be adjusted without sacrificing the available power to single consumer.

According to a preferred embodiment, the multiphase AC voltage has amplitude which is controlled to be constant. When a fixed amplitude is used, the magnetic flux of the magnetic components in the system changes as the frequency is changed. However, if the amplitude of the voltage is slightly reduced when the frequency is lowered, the increase of the magnetic flux can be somewhat reduced.

According to an embodiment of the invention, a property relating to the prime movers is optimized with the adjustment of the rotational speed reference. Such a property is, for example fuel consumption of the prime movers. Thus in the embodiment, the rotational speed of the prime movers is allowed to change to minimize the fuel consumption. The changed rotational speed of the engines means also changed frequency of the generated AC voltage.

In known systems the rotational speed of the generators is kept constant so that a fixed frequency is produced to the multiphase voltage bus. This means that the power demand i.e. the load of the generators dictate the operation point of the prime movers. The prime movers are typically optimized for operation in certain power level with a fixed frequency. However, the change in rotational speed also affects the consumption of fuel, and this property is employed in the embodiment.

In an embodiment, the prime movers receive a rotational speed reference from the upper level control system, and the generators synchronize their output frequency to the reference such that an alternating voltage bus is formed in which the frequency is adjustable. Thus the upper level control system optimizes the fuel consumption or other optimized property by instructing the one or more parallel generators to run with a frequency that minimizes the fuel consumption or other property of the prime movers.

In the invention, independent reference values for a rotational speed of the prime movers and for amplitude of the multiphase voltage are provided. Preferably the rotational speed reference is used for optimizing a property relating to the prime movers and the amplitude reference is used for changing the magnetic flux in the system such that the magnetic components are not saturated.

With the present invention, reliable and robust AC technology can be employed. Further, the system enables to transmit the electric power using either AC technology or DC technology according to a selected design.

BRIEF DESCRIPTION OF THE DRAWINGS

In the following the invention will be described in greater detail by means of preferred embodiments with reference to the attached drawings, in which.

DETAILED DESCRIPTION OF THE INVENTION

Figure 2:
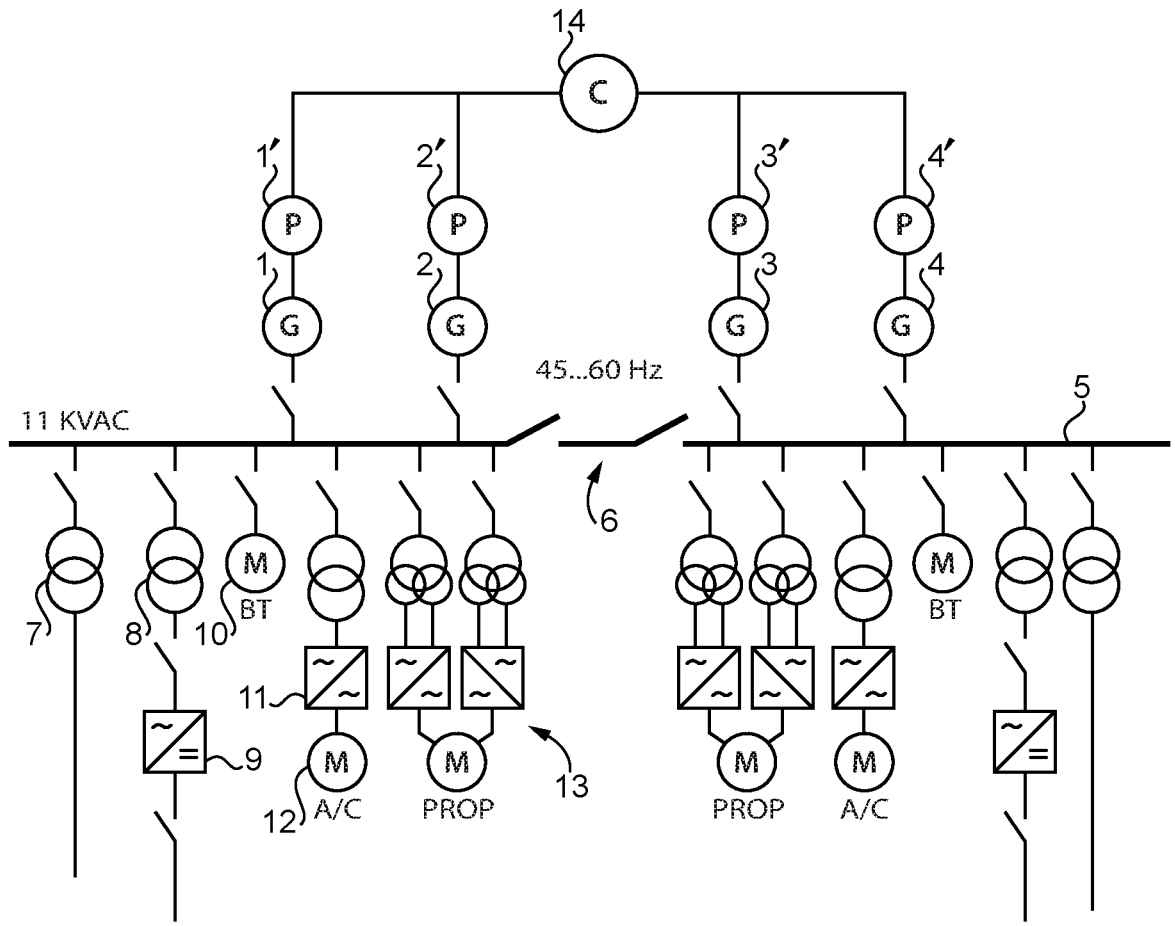
FIG. 2 shows an embodiment of the system of the invention.

FIG. 2 shows a main circuit diagram of a system according to an embodiment of the present invention. In FIG. 2, four multiphase AC generators 1, 2, 3 and 4 are connected to an AC bus 5. The AC bus consists of bus bars, i.e. conductors for each phase of the generated multiphase voltage and of circuit breaker 6 which can be used for splitting the bus into two independent sections even when the bus carries nominal current. In the example of FIG. 2, the voltage of the bus and thus the output voltage of the generators is constant 11 kV. The nominal powers of the generators may be in the class of megawatts in which case the generated power is sufficient for electrifying large ships with an electrical propulsion system.

FIG. 2 further shows various loads connected to the AC bus. In the example the propulsion system is driven electrically and FIG. 2 shows the power system 13 for the propulsion. Such power system comprises transformers, frequency converters and a motor driving the propeller. Further loads presented in FIG. 2 include electric drive 11, 12 for compressor of the device for producing chilled water for cooling purposes and direct on line connected motor 10, such as a bow thruster.

FIG. 2 shows further a transformer 7 intended to transform and further distribute electricity within the ship for other functions of the ship. Such other functions may relate to accommodation and restaurants in a passenger ships and various working machines in different working vessels, such as drilling and pumping machines. A possibility for DC distribution of power is also shown in the example FIG. 2, as an AC to DC converter 9 is presented connected to the AC bus through a transformer 8.

As seen in the FIG. 2, the various components and loads are presented in duplicate. Due to redundancy requirements the prime movers and the main electrical components are installed in at least two separate spaces. Common AC bus connecting the spaces together can be split by opening the circuit breaker 6.

According to the present invention the electric power generation system of a ship comprises one or more generators 1, 2, 3, 4 for producing electrical energy. In the example of FIG. 2 four generators are presented. The number of generators connected to the power generation system is not limited to any specific amount. Each of the generators 1, 2, 3, 4 is driven with a corresponding prime mover 1', 2', 3', 4', such as a diesel engine. These prime movers 1', 2', 3', 4' are directly connected to the shafts of the generators 1, 2, 3, 4 so that each generator rotates with a corresponding prime mover 1', 2', 3', 4'.

As mentioned above, the generators used in the invention are multiphase AC generators. Typically, the generators are three-phase AC generators producing three phase voltage. The generators used in production of power in a large ship are megawatt class generators. The nominal powers of the generators may be equal or such that for example two generators are of smaller rating and rest of the generators have higher power rating.

The phase outputs of the generators are connectable to a common multiphase bus. FIG. 2 shows breakers between the bus 5 and the generators. The breakers are operated to adjust the production capacity connected to the bus. The bus 5 consists of bus bars or similar conducting members that are used for distributing the generated electrical power to the loads or consumers. The phase number of multiphase bus corresponds to that of the generators, and is typically a three-phase bus having three bus bars. The generators are AC generators and the produced voltage has a frequency which is common to all the generators.

In an embodiment of the invention, the amplitude of the generated multiphase AC voltage is kept constant although the frequency of the AC voltage changes. When producing AC voltage with constant amplitude, the available power stays constant irrespective of the frequency of the AC voltage. In generators the constant AC voltage is obtained by controlling the magnetization of the generators in a manner known as such.

According to the invention the system comprises means for providing rotational speed reference for the prime movers. As known, the rotational speed of the prime mover define the frequency of the generated voltage as each prime mover is directly connected to a corresponding generator. In the invention, the reference value for rotational speed of the prime mover is independent from the reference value for amplitude of the multiphase voltage. That is to say that separate reference values are given for amplitude and rotational speed and the reference values are not directly proportional to each other. Further in the invention, the electric power generation system is adapted to operate in at least three operation points on the basis of the reference values. The operation point is defined as the ratio of the amplitude of the multiphase voltage to the frequency of the multiphase voltage.

In a typical control system for variable frequency operation of an electrical system the frequency and amplitude of the voltage are controlled such that the amplitude is changed on the basis of the change of frequency. When the frequency is changed, the amplitude follows the change to maintain the ratio of the amplitude of the voltage to the frequency constant. In the present invention, the frequency and the amplitude of the generated voltage are not controlled linearly dependent on each other which provide flexibility in the design and use of an electrical power generation system.

The ability to provide a rotational speed reference for the prime movers 1', 2', 3', 4' means that the frequency of the generated multiphase voltage can be set to a given value based on specific need or purpose. The prime movers 1', 2', 3', 4' mechanically connected to the generators can be set to a desired rotational speed and thereby the frequency of the outputted voltage follows the rotational speed of the generators. The means adapted to provide the rotational speed reference are preferably implemented in an upper level control system 14, such as power management system of a ship. A rotational speed reference for a prime mover 1', 2', 3', 4' can be considered as a frequency reference as the relationship between the mentioned rotational speed and the frequency of the generated voltage is linear. Thus the upper level control system 14 may provide a frequency reference that is changed to be a corresponding rotational speed reference that is given to the prime movers 1', 2', 3', 4'.

According to an embodiment of the invention, the system comprises means that are adapted to optimize a property relating to the prime movers by adjusting the rotational speed reference of the prime movers. Thus in the embodiment the rotational speed reference and thus the frequency of the outputted voltage is changed so that a property relating to the prime movers is optimized. The fact that a property is optimized refers to a set of actions in which the frequency of the outputted voltage is adjusted to a value where a measurable property relating to the prime movers is brought to a more desirable value.

According to an embodiment of the invention, the optimized property relating to the prime movers is the fuel consumption of the prime movers. In another embodiment of the invention, the optimized property relating to prime movers is emission level of the prime movers. In another embodiment, the optimized property relating to prime movers is noise level of the prime movers. When the produced amplitude of the AC voltage is kept constant while the frequency is variable, the system enables optimization of the parameters in a large scale. The rotational speed of the prime movers or the output frequency can be adjusted to a point which optimizes the fuel consumption, for example, and still the single users are able to draw their nominal power from the power generation system.

In the following, an embodiment, in which optimized property relating to the prime movers is the fuel consumption of the prime movers, is described in detail. In the embodiment, the frequency of the multiphase voltage is adjusted or changed to take account the fuel consumption of the prime movers. The change of the frequency means in practice that the system is operating with a frequency that differs from the nominal frequency of the used equipment. Preferably, the frequency and thus the rotational speed of the prime mover are lowered from the nominal value and the preferred range in which the optimization is carried out is in the speed range of 60% to 100% of the nominal rotational speed of the prime mover. If the nominal frequency of the electricity produced with the generators is 60 Hz, then the 60% rotational speed of the prime mover produces voltage having a frequency of 36 Hz. Correspondingly, if the nominal frequency of the generator is 50 Hz, then the 60% rotational speed corresponds to voltage having a frequency of 30 Hz. The strict limits of operation are, however, depending on the design and type of the prime mover, and the lower limit of produced frequency may be as low as 50% of the nominal frequency or even lower.

The above nominal frequency relates to the frequency of the output voltage obtained when the prime mover is rotating at its nominal rotational speed. This nominal rotational speed would in conventional operation produce a frequency that is said to be nominal i.e. 50 Hz or 60 Hz.

Figure 1:
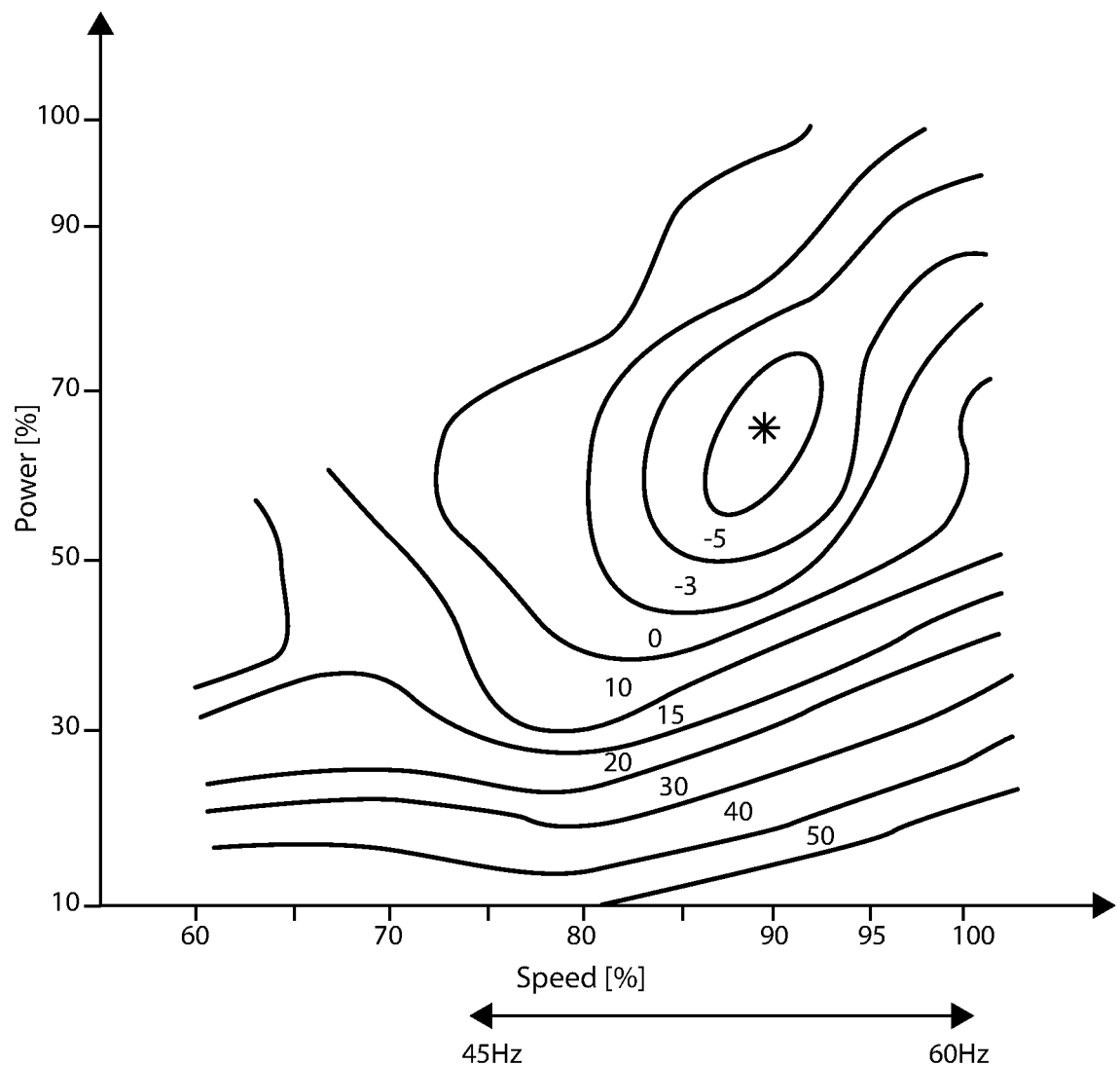
FIG. 1 shows an example of consumption of fuel as a function of rotational speed and generated power of a prime mover.

FIG. 1 shows an example of a chart indicating fuel consumption of a diesel engine as a function of rotational speed of the engine and power of the engine. The fuel consumption is shown as change in g/kWh from the operation point with 100% rotational speed and 100% power level. The consumption is read from the chart such that the lines indicate certain increase or decrease of the consumption in g/kWh. For example, the most optimal operation point is approximately with 90% rotational speed and approximately 70% power marked with * in the chart. When departing from the circle, the consumption increases. As seen from the chart, the change of consumption is greater in lower range of produced power while in the higher range of power the space between the lines is wider indicating smaller changes in the consumption when the operation point changes.

According to a preferred embodiment of the invention the means adapted to optimize a property, such as fuel consumption of the prime movers, comprise a readable database indicating the amount of property, such as amount of fuel consumption, as a function of rotational speed of the prime mover and loading level of the prime mover. The readable database, such as a look-up table, of the embodiment is a three-dimensional table in which the data relating to optimized property relating to prime mover is stored in such a manner, that the data can be accessed by a processor or similar device for reading the data in different operation points. For that purpose the optimizing means comprise means adapted to read the database on the basis of known loading level of the prime mover and adapted to output a rotational speed value minimizing or optimizing the desired property relating to prime movers.

In the invention, reference value is provided for the rotational speed of the prime movers for generating multiphase voltage with a frequency corresponding to the rotational speed. A rotational speed reference given to the prime mover corresponds to a certain frequency reference for obtaining alternating voltage having the desired frequency.

The frequency of the generated voltage is adapted to follow the rotational speed reference. The reference is given preferably to the prime movers as a rotational speed reference that corresponds to the frequency reference. The prime mover acts to increase or decrease fuel injection such that the rotational speed corresponds to the reference.

The chart of FIG. 1 is stored as a readable database, such as a readable table. According to the idea of the embodiment, when operating in a steady state, the current consumption value is compared with other consumption values with the same power level. For example, when operation is in the nominal speed of the generator and the generated and required power level is 50% of the nominal power, it can be read from the chart of FIG. 1 that the fuel consumption is minimized when the rotational speed of the prime mover is lowered to approximately 85% of the nominal rotational speed. When values in the table indicate that a lower consumption is available, a rotational speed reference is given to the one or more active prime movers. When the operation is changed to another power level, the optimization procedure is repeated.

The consumption chart of FIG. 1 is stored in accessible form for each individual prime mover installed in the system. Look-up tables or similar databases may also be formed for any combination of the prime movers installed in the system. When optimizing the fuel consumption, either the combined chart indicating the consumption of currently active prime movers is read or each individual chart corresponding to the currently active prime movers are read and the corresponding fuel consumptions are summed to obtain combined consumption.

Figure 3:
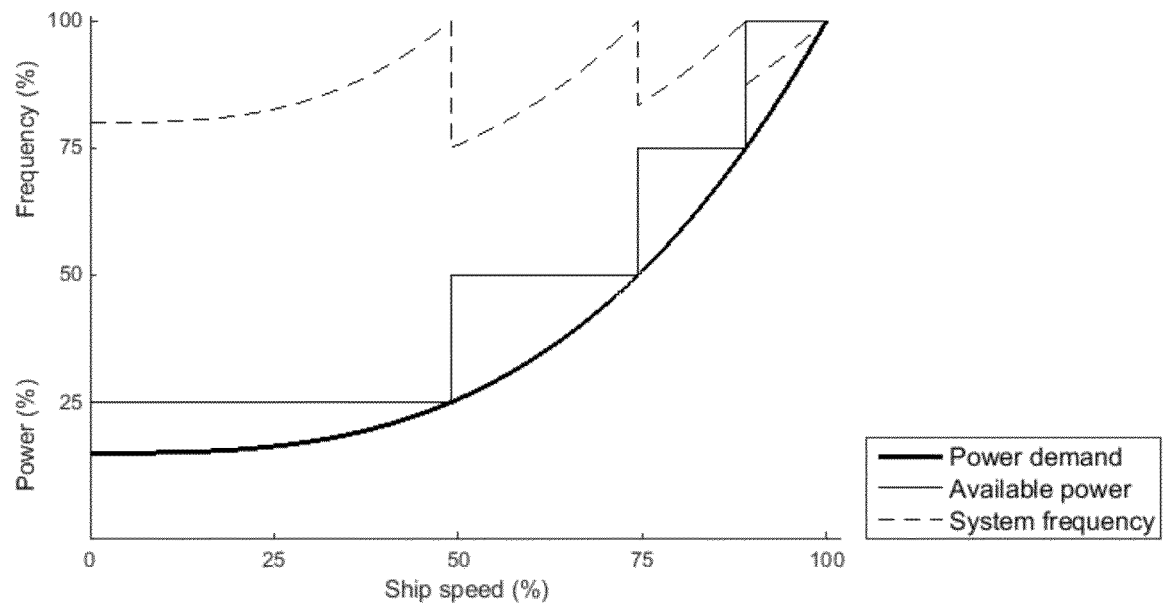
FIG. 3 shows an example of power demand curve and system frequency curve as a function of ship speed.

FIG. 3 shows an example of a power demand curve together with system frequency and available power when the amplitude of the generated voltage is controlled to be constant. The example of FIG. 3 illustrates the idea of the invention in a ship or a vessel in which four generators are connectable to produce electrical energy to the system. In addition to speed dependent propulsion power, the power demand curve includes constant auxiliary load which is seen from the fact that power is demanded even though the ship speed is zero.

As seen from the curves, when the speed of the ship is in the range of zero to 50% of the full speed, one generator is sufficient to produce the demanded power. Thus the frequency can be changed to optimize a property relating to the prime movers. When the power demand increases with increasing ship speed, more generators are connected to produce power. For example, when the ship speed exceeds 50% of the maximum speed, a second generator is connected to produce power and at the same time, the system frequency can be lowered. Similarly with increasing power demand more generators are connected to the system. When power demand is reduced, the number of the active generators can be decreased.

The above example is to illustrate the operation of the power generation with respect to frequency of the generated voltage. In the optimization of certain parameter multiple generators may be employed even though enough power would be available with smaller amount of generators. This is due to the fact that parameter optimization takes into account the power levels of individual generators. As an example, it might be desirable to produce power with three generators with 63.3% of the maximum capacity of the generators than two generators with 95% capacity.

The means adapted to optimize a property relating to the prime movers, such as the fuel consumption, is preferably formed in an upper level controller that also controls other functions relating to the power generation system of the ship. The upper level controller receives information on the amount of produced power and on the requested power. Based on the produced power and requested power the upper level controller decides whether to change the generators currently in use or to continue operation with the current set-up. In deciding the operating generators, the optimization is taken into account. If, on the basis of the stored charts, it is foreseen that the fuel consumption is reduced if the current load is shared with multiple prime movers, then the upper level controller conducts such operation and sets a rotational speed reference or a frequency reference to optimize the fuel consumption. In similar manner, the upper level controller may decrease the number of prime movers in use.

As mentioned, the rotational speed of the prime movers, and thus the generated frequency, is allowed to vary within certain limits. The various electrical components required for operation of power generating system are able to function within the set limits. According to the invention, a reference value for the amplitude of the generated voltage is provided independently of the rotational speed reference. When, according to an embodiment of the invention, the voltage is kept constant, the various magnetic components, such as generators and transformers need to be designed to take account such operation.

When the amplitude of voltage is kept constant with a fixed reference value, and the frequency varies, the ratio between amplitude and the frequency in not constant. As known, when the mentioned Volts/Hertz-ratio is kept constant, the magnetic flux in the magnetic components is also constant. According to an embodiment, the amplitude of the voltage is kept substantially constant while the frequency is adjusted. Therefore, in the system of the invention magnetic flux in the magnetic components, such as transformers, generators and electric motors, varies. The variation of the magnetic flux needs to be taken into account so that the magnetic parts cannot be saturated. The magnetic parts of the components need to be designed according to the lowest possible frequency. In practice, the size of magnetic parts, such as iron cores of transformers, generators and motors, needs to be increased such that the magnetic cores are not saturated. The larger core structures enable to use lower system frequencies and therefore optimization of the operation of the system can be carried out in wider range.

According to an embodiment, the optimized property relating to the prime movers is an emission level of the prime movers. As with the above described embodiment relating to optimizing the fuel efficiency of the prime movers, a chart or similar table can be formed of the emissions of the prime movers. Such a chart represents the level of emissions as a function of the rotational speed of the prime movers and the generated power. The operation and structure of the embodiment is similar to that of the above described embodiment relating to fuel efficiency with the exception that instead of optimizing fuel consumption of the prime movers, the emission level is optimized. The emissions level of prime movers is not necessarily at the lowest when the consumption of the prime movers is optimized. The emission levels depend on the type of prime mover and on the type of the fuel used in the prime mover. Further, the optimization of the emission level may be based on different emissions, such as air pollutants or greenhouse gases. When operating according to the embodiment, a selected property of the emissions is optimized, or preferably minimized, by adjusting the rotational speed of the prime movers.

According to another embodiment of the invention, the property relating to the prime movers is noise level of the prime movers. As some rotational speeds of the prime movers may wake resonances or otherwise be noisier than other rotational speeds, the rotational speed of the prime movers is optimized according to the noise level when silent operation is preferred. As with the above embodiments, a chart or look-up table may be formed of noise levels with different rotational speeds and power levels. When operating in such silent mode, the rotational speed of the prime movers is selected that optimizes the noise level. When a chart or look-up table is formed, the operation and structure of the optimization is as described above.

Further, the noise level may also be optimized by selecting a set rotational speed in which the system operates. In such an embodiment the rotational speed of the prime movers is fixed and it does not change despite the changes in the power level. The optimization of noise level may be desirable in some situations. For example, when departing from a port the noise level of the thruster motors can be lowered by lowering the rotational speed of the prime movers to the lowest allowable speed or any other rotational speed which is known to provide lowest noise level. In some cases, the thruster motors are directly connected to the AC bus and rotate at a speed depending on the frequency of the voltage. When the rotational speed reference and thus the frequency can be adjusted, also the rotational speed of the thrusters is adjusted. The noise from the thrusters can be minimized by selecting a suitable frequency of the generated AC voltage.

As, according to the invention, a rotational speed reference for prime movers is provided, the frequency of the generated voltage can be forced or set to be at the nominal frequency by giving a fixed rotational speed reference to the prime movers. This effectively removes the optimization from use, and the system acts as a traditional system. The optimization can again be taken into use at any time.

The operation point of the prime movers is changed in an embodiment of the invention due to optimization of fuel consumption. The obtained savings can be up to 10% with respect to conventionally operated power generating system.

The rotational speed of the prime movers and thus the frequency of the voltage are optimized preferably when the power demand has been stable for a prescribed time period. The rotational speed reference of the system is not necessarily changed with each change of power level. Typically long voyages are made with large ships and thereby ships are operated for long periods in substantially constant conditions. Such long periods of time with constant speed of the ship are suitable conditions for optimization of the fuel consumption. According to an embodiment of the invention, the means adapted to optimize a property relating to the prime movers are operated after the load level of the generators has been in a substantially constant level for a set period of time. The set period of time can be in the range of 10 to 15 minutes, for example. However, the set period of time can be set manually to a desired value such that the optimization can react more promptly to changed conditions. The optimization can also be initiated or forced by a personnel when, for example a new power level is required and reached by a command originated from the increase of cruise speed, the personnel can initiate the optimization instantly when the power level and the speed is obtained.

The main consumer of the produced power in a ship or vessel is typically the propulsion system. Therefore the optimization of the fuel consumption or emission level is preferably based on the power used by the propulsion system. The above referred substantially constant load level refers to a load level, which does not show increasing or decreasing trend, but has been stabile with variations within few percentages of the power level.

FIG. 1 shows under the horizontal axis the possible variation of the output frequency of the voltage produced by the generators with respect to variation in the rotational speed of the prime movers when the nominal frequency of the generator is 60 Hz.

In the optimization, the means adapted to optimize the fuel consumption may also include a model of the generators. In such a case the operation of the generators is simulated in the model. The model gives estimates on the property relating to the prime movers and on the property with differing rotational speeds. Once the model produces optimized property, such as minimum fuel consumption, in a certain rotational speed value, the rotational speed is given as a reference to the actual process.

According to an embodiment of the invention the means adapted to optimize a property relating to the prime movers comprise means adapted to receive values of the optimized property during the use of the prime movers. These received values are gathered during preferably before the optimization for producing the readable look-up table or similar database. For receiving the values the system receives signals representing values that are measured form the system. Such values are, for example, fuel consumption data. The measured fuel consumption is communicated to the means adapted to optimize the property together with rotational speed and power level data such that a readable chart, map, look-up table or similar database can be formed.

The readable database, such as a look-up table may also be provided by the manufacturer of the prime mover. If, however, such a database is not provided, it can be formed during the use of the prime movers when the ship is in operation. In such a case during the use of the ship the rotational speed of the generators are adjusted manually or with a certain logic in different power levels. The optimized property, such as fuel consumption, is measured and stored to form a database which can be used for optimization purposes.

Any measurable property relating to the prime movers can be stored to form such a database, and based on the database the property can also be optimized by changing the rotational speed to a value that optimizes the property. Further, it may be advisable to update the database with measured data as the properties of the prime movers may change during use and variations fuels used in the prime movers may change the optimum areas of operation.

The frequency of the AC voltage generated by the system of the invention is not fixed to 50 Hz or 60 Hz. If some consumers or loads demand stable frequency for the operation, this can be carried out by employing a converter device for providing such voltage. The converter may be a frequency converter connected directly to the variable frequency AC voltage or an inverter connected to DC voltage if such is available. As the voltage of the generators is kept substantially constant, frequency converters employed in the system for various loads do not require active front-end converters. That is to say that frequency converters of the system can operate with passive rectifying bridges as the voltage does not have to be boosted in the frequency converters.

The prime mover employed in the invention can be of any type of rotating machine that produces rotational movement from an energy source. Examples of such machines include, but are not limited to, combustion engines, such as diesel engines, gas turbines or engines that use fuel oil or gas in any form. The chart of FIG. 1 is further given as an example of a chart that can be used in optimizing a property relating to prime movers. The chart of FIG. 1 drawn up to illustrate the advantages obtained with the invention.

The type of generator connected to the shaft of the prime mover is not limited to any specific type of generator. Preferably the one or more generators of the invention are synchronous generators. However, the invention can be embodied also with other AC generators.

According to the invention, a reference value for the amplitude of the multiphase voltage is provided. The reference value for the amplitude may have a constant value whereby the generator is then adapted to operate such that a fixed amplitude is produced. As known, although the reference for amplitude is fixed, the amplitude may vary within certain limits taking into account the dynamic changes the system. For example, the amplitude may vary within limits of ±5% of the nominal or rated value of the voltage.

The system of the invention is adapted to operate in at least three operation points, and the operation points are defined by ratio of the amplitude of the multiphase voltage to the frequency of the multiphase voltage. The three operation points may by, for example operation points in which the amplitude of the voltage is constant and the frequency has three different values, such as the nominal frequency of the system, lowest allowable frequency of the system and a frequency corresponding to 90% of the nominal frequency of the system. Further, the three operation points may be operation points in which frequency is constant and voltage has values 100%, 98% and 97% of the nominal voltage. It is clear, that the at least three operation points can be achieved in multiple of ways.

Figure 4:
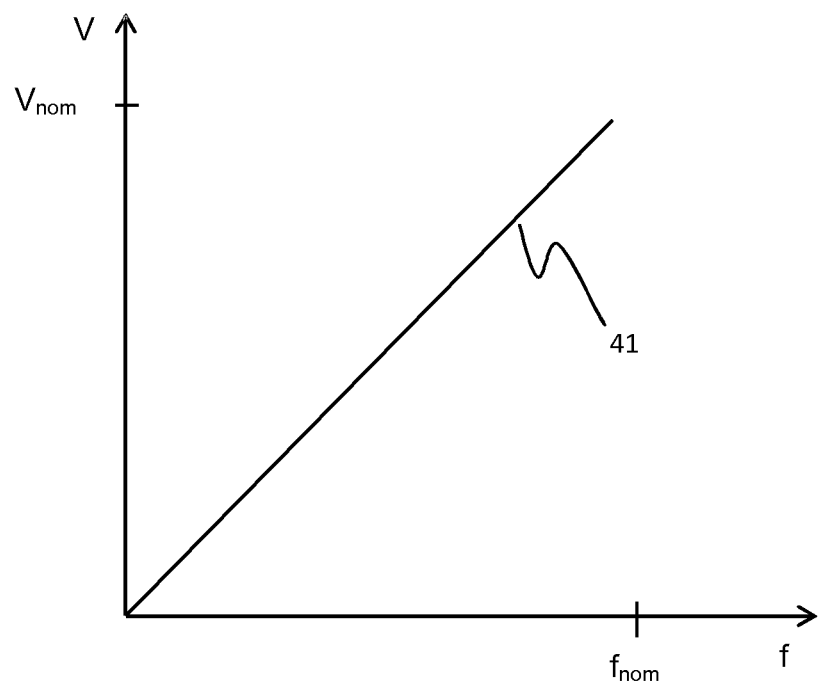
FIG. 4 shows a constant ratio line in voltage/frequency plane.

According to an embodiment, the operation point has a lowest value at the nominal frequency and at the nominal voltage. The above electrical operation point defines the operation in voltage/frequency plane. When the lowest value of the ratio is at the nominal frequency $f_{nom}$ and at the nominal voltage $V_{nom}$ as shown in FIG. 4, the other possible operation points situate above the constant ratio line 41 of FIG. 4. When the frequency of an electrical system is changed using the known constant Volts/Hertz-ratio, the above defined operation point remains constant and follows the mentioned line 41.

According to the present disclosure, the amplitude of the generated voltage is adjusted to vary together with the frequency such that constant Volts/Hertz-ratio is not maintained. For example, the amplitude of the voltage is lowered by 5% from the rated value when the frequency is at the lowest allowable value which may be, for example 75% of the nominal frequency. With such a decrease of the amplitude of the voltage the magnetic components need to be designed to withstand only slightly higher magnetic fluxes without saturation than normally. In this manner, the voltage can remain at the rated value for smaller frequency variation and be reduced only at higher frequency decreases. The change of voltage amplitude with respect to frequency does not have to be linear. The rotational speed reference and voltage amplitude reference are provided separately to the generator-prime mover combination. Although the references are independent from each other, a certain relation between the references can be provided. Further, when the relation between the frequency and the amplitude of the voltage is set, the amplitude reference can be read from a table or similar when a rotational speed reference is given.

According to an embodiment, the reference value for amplitude of the multiphase voltage is adapted to be changed to decrease the change of the magnitude of magnetic flux such that maximal increase of the magnitude of magnetic flux is limited to approximately 5% of a rated magnitude of magnetic flux.

The slight adjustment of voltage with respect to frequency is especially suitable for retrofit applications where an existing installation is turned into variable frequency system without changing all the components. In such connection, the magnetic design of the existing magnetic components is analysed and the frequency-voltage characteristics are defined to comply with the system components. In connection with new installations the slight lowering of the amplitude of the voltage gives possibilities in design of the magnetic properties of the system components. When the amplitude of the voltage is lowered, the magnetic cores can be made somewhat smaller. However, when the amplitude of the voltage is reduced, the power available to single consumers is reduced and the optimization of the operation of the system is somewhat reduced.

In the above, the system is described in connection with a ship or a vessel. The system can also be used as a separate micro-grid in which electrical energy is produced using generators rotated with prime movers.

It will be obvious to a person skilled in the art that, as the technology advances, the inventive concept can be implemented in various ways. The invention and its embodiments are not limited to the examples described above but may vary within the scope of the claims.

The invention claimed is:

1. An electric power generation system comprising
   more than one generator for producing electrical energy, each generator being arranged to be driven with a corresponding prime mover, wherein each generator is a multiphase AC generator adapted to generate a multiphase voltage having a frequency and an amplitude, the phase outputs of the more than one generator are connectable to a common multiphase bus for distributing the electrical energy generated by the AC generators,
   independent reference values for a rotational speed of the prime movers and for amplitude of the multiphase voltage, the rotational speed of the prime movers defining the frequency of the multiphase voltage, and
   the system is adapted to operate in at least three operation points on the basis of the independent reference values, an operation point being defined by a ratio of the amplitude of the multiphase voltage to the frequency of the multiphase voltage, wherein the at least three operation points are different,
   wherein the electric power generation system comprises means adapted to optimize a property relating to the prime movers by adjusting the reference value for rotational speed of the prime movers, and
   wherein the means adapted to optimize the property relating to the prime movers are operated after the load level of each generator has been in a substantially constant level for a set period of time.

2. The electric power generation system according to claim 1, wherein the means adapted to optimize the property relating to the prime movers comprise
   a readable database indicating the optimized property as a function of rotational speed of the prime movers and loading level of the prime movers,
   means adapted to read the database on the basis of a known loading level of the prime movers and adapted to output a rotational speed referee optimizing the property relating to the prime movers.

3. The electric power genera ion system according to claim 1, wherein the means adapted to optimize a property relating to the prime movers comprise means adapted to receive values of the optimized property during the use of the prime movers, and
   means adapted to store the received values of the optimized property together with respective loading level and rotational speed in a readable database.

4. The electric power generation system according to claim 1, wherein the means adapted to optimize the property relating to prime movers are incorporated in an upper level control system, such as power management system.

5. The electric power generation system according to claim 1, wherein the means adapted to optimize the property relating to prime movers comprise further a lower limit value for the rotational speed reference of the prime movers, which is 60% of the nominal rotational speed of each generator.

6. The electric power generation system according to claim 1, wherein each AC generator is a three-phase generator.

7. The electric power generation system according to claim 1, wherein a converter device is connected to the common multiphase bus for producing a voltage having a fixed frequency or wherein a converter device is connected to the common multiphase bus for producing DC voltage.

8. The electric power generation system according to claim 1, wherein the means adapted to optimize a property relating to the prime movers are adapted to select the number of prime movers that are operated.

9. The electric power generation system according to claim 1, wherein the property relating to the prime movers is fuel consumption of the prime movers.

10. The electric power generation system according to claim 1, wherein the property relating to the prime movers is emission level of the prime movers.

11. The electric power generation system according to claim 1, wherein the property relating to the prime movers is noise level of the prime movers.

12. The electric power generation system according to claim 1, wherein the rotational speed reference of the prime movers is adjusted to a fixed value.

13. The electric power generation system according to claim 1, wherein the reference value for amplitude of the multiphase voltage is constant and the frequency of the multiphase voltages adjusted by adjusting the reference value for rotational speed of the prime movers.

14. The electric power generation system according to claim 13, wherein the magnitude magnetic flux of the magnetic components of the power generation system changes when the frequency of the generated voltage changes.

15. The electric power generation system according to claim 1, wherein the reference value for amplitude of the multiphase voltage is adapted to be changed to decrease the change of the magnitude of magnetic flux such that maximal increase of the magnitude of magnetic flux is limited to approximately 5% of a rated magnitude of magnetic flux.

16. A ship comprising the electrical power generation system of claim 1.

17. An electric power generation system comprising
more than one generator for producing electrical energy, each generator being arranged to be driven with a corresponding prime mover, wherein each generator is a multiphase AC generator adapted to generate a multiphase voltage having a frequency and an amplitude, the phase outputs of the more than one generator are connectable to a common multiphase bus for distributing the electrical energy generated by the AC generators,
independent reference values for a rotational speed of the prime movers and for amplitude of the multiphase voltage, the rotational speed of the prime movers defining the frequency of the multiphase voltage, and
the system is adapted to operate in at least three operation points on the basis of the independent reference values, an operation point being defined by a ratio of the amplitude of the multiphase voltage to the frequency of the multiphase voltage, wherein the at least three operation points are different,
wherein the electric power generation system comprises means adapted to optimize a property relating to the prime movers by adjusting the reference value for rotational speed of the prime movers, and
wherein the means adapted to optimize the property relating to prime movers comprise further a lower limit value for the rotational speed reference of the prime movers, which is 60% of the nominal rotational speed of each generator.

18. The electric power generation system according to claim 17, wherein the means adapted to optimize the property relating to the prime movers comprise
a readable database indicating the optimized property as a function of rotational speed of the prime movers and loading level of the prime movers,
means adapted to read the database on the basis of a known loading level of the prime movers and adapted to output a rotational speed referee optimizing the property relating to the prime movers.

19. An electric power generation system comprising
more than one generator for producing electrical energy, each generator being arranged to be driven with a corresponding prime mover, wherein each generator is a multiphase AC generator adapted to generate a multiphase voltage having a frequency and an amplitude, the phase outputs of the more than one generator are connectable to a common multiphase bus for distributing the electrical energy generated by the AC generators,
independent reference values for a rotational speed of the prime movers and for amplitude of the multiphase voltage, the rotational speed of the prime movers defining the frequency of the multiphase voltage, and
the system is adapted to operate in at least three operation points on the basis of the independent reference values, an operation point being defined by a ratio of the amplitude of the multiphase voltage to the frequency of the multiphase voltage, wherein the at least three operation points are different,
wherein the reference value for amplitude of the multiphase voltage is adapted to be changed to decrease the change of the magnitude of magnetic flux such that maximal increase of the magnitude of magnetic flux is limited to approximately 5% of a rated magnitude of magnetic flux.

20. The electric power generation system according to claim 19, wherein the means adapted to optimize the property relating to the prime movers comprise
a readable database indicating the optimized property as a function of rotational speed of the prime movers and loading level of the prime movers,
means adapted to read the database on the basis of a known loading level of the prime movers and adapted to output a rotational speed referee optimizing the property relating to the prime movers.

* * * * *